United States Patent
Becker et al.

(10) Patent No.: US 9,626,086 B1
(45) Date of Patent: *Apr. 18, 2017

(54) ADJUSTING ERASER SIZE IN DRAWING APPLICATIONS

(71) Applicant: International Business Machines Corporation, Armonk, NY (US)

(72) Inventors: Craig H. Becker, Austin, TX (US); David Jaramillo, Lake Worth, FL (US); Richard J. Newhook, Egg Harbor City, NJ (US); Duy V. Nguyen, Delray Beach, FL (US); Jon G. Temple, Southbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/296,361

(22) Filed: Oct. 18, 2016

Related U.S. Application Data

(63) Continuation of application No. 14/868,432, filed on Sep. 29, 2015.

(51) Int. Cl.
    *G06F 3/0484*      (2013.01)
    *G06F 3/0482*      (2013.01)
    *G06F 3/0488*      (2013.01)

(52) U.S. Cl.
CPC ........ *G06F 3/04845* (2013.01); *G06F 3/0482* (2013.01); *G06F 3/04883* (2013.01)

(58) Field of Classification Search
CPC ...... G06T 11/08; G06T 11/203; G06F 3/0488; G06F 3/04883
See application file for complete search history.

(56) References Cited

U.S. PATENT DOCUMENTS

| | | | |
|---|---|---|---|
| 5,404,439 | A | 4/1995 | Moran et al. |
| 5,548,705 | A | 8/1996 | Moran et al. |
| 6,326,954 | B1 | 12/2001 | Van Ieperen |
| 9,329,772 | B1 | 5/2016 | Becker et al. |

(Continued)

FOREIGN PATENT DOCUMENTS

JP      2015022524 A     2/2015

OTHER PUBLICATIONS

Becker et al., "Adjusting Eraser Size in Drawing Applications", U.S. Appl. No. 14/868,432, filed Sep. 29, 2015, 28 pages.

(Continued)

*Primary Examiner* — Jeffery A Brier
(74) *Attorney, Agent, or Firm* — Christopher McLane

(57) ABSTRACT

The method includes identifying, by one or more computer processors, a first location and a second location of input on a touch-sensitive surface. The method further includes calculating, by one or more computer processors, a distance between the first location and the second location. The method further includes identifying, by one or more computer processors, a first elapsed time between creation of the identified first location of input and the identified second location of input. The method further includes calculating, by one or more computer processors, a first size of an eraser based upon the identified first elapsed time. The method further includes generating, by one or more computer processors, an eraser path based upon the identified first location and the identified second location of input on a touch-sensitive surface, and the calculated first size of an eraser.

1 Claim, 3 Drawing Sheets

(56) References Cited

U.S. PATENT DOCUMENTS

| | | |
|---|---|---|
| 9,417,786 B1 | 8/2016 | Becker et al. |
| 2012/0302167 A1 | 11/2012 | Yun et al. |
| 2013/0346878 A1 | 12/2013 | Mason |
| 2013/0346910 A1 | 12/2013 | Mason |
| 2014/0223334 A1 | 8/2014 | Jensen et al. |
| 2014/0223335 A1 | 8/2014 | Pearson |

OTHER PUBLICATIONS

Appendix P, List of IBM Patents or Patent Applications Treated As Related, 2 pages, dated Dec. 1, 2016.

ADJUSTING ERASER SIZE IN DRAWING APPLICATIONS

BACKGROUND

The present invention relates generally to image editing, and more particularly to adjusting the size of an eraser based upon the speed of movement.

A touchscreen is an input device normally layered on the top of an electronic visual display of an information processing system. A user can give input or control the information processing system through simple or multi-touch gestures by touching the screen with a special stylus/pen and/or one or more fingers. The user can use the touchscreen to react to information that is displayed and to control displayed objects (e.g., zooming in on a picture).

The touchscreen enables the user to interact directly with information that is displayed, rather than using a mouse, touchpad, or any other intermediate device (other than a stylus, which is optional for most modern touchscreens).

In computer graphics, graphics software or image editing software is a program or collection of programs that enable a person to manipulate visual images on a computer. These are the application softwares that let the user create and manipulate any type of computer graphics with the use of an operating system.

A Bézier curve is a parametric curve frequently used in computer graphics and related fields. Generalizations of Bézier curves to higher dimensions are called Bézier surfaces, of which the Bézier triangle is a special case.

In vector graphics, Bézier curves are used to model smooth curves that can be scaled indefinitely. "Paths," as they are commonly referred to in image manipulation programs, are combinations of linked Bézier curves. Paths are not bound by the limits of rasterized images and are intuitive to modify.

Bézier curves are also used in the time domain, particularly in animation and user interface design. For example, a Bézier curve can be used to specify the velocity over time of an object, such as an icon moving from A to B, rather than simply moving at a fixed number of pixels per step. When animators or interface designers talk about the "physics" or "feel" of an operation, they may be referring to the particular Bézier curve used to control the velocity over time of the move in question.

SUMMARY

Embodiments of the present invention disclose a method, computer program product, and system for generating an eraser path. In one embodiment, in accordance with the present invention, the computer-implemented method includes identifying, by one or more computer processors, a first location and a second location of input on a touch-sensitive surface. The method further includes calculating, by one or more computer processors, a distance between the first location and the second location. The method further includes identifying, by one or more computer processors, a first elapsed time between creation of the identified first location of input and the identified second location of input. The method further includes calculating, by one or more computer processors, a first size of an eraser based upon the identified first elapsed time. The method further includes generating, by one or more computer processors, an eraser path based upon the identified first location and the identified second location of input on a touch-sensitive surface, and the calculated first size of an eraser.

DETAILED DESCRIPTION

Embodiments of the present invention recognize that a user may want to erase items in a drawing or image editing program. If a user quickly moves a finger across a screen, the user is most likely trying to delete a wide area. If a user slowly moves a finger across a screen, the user is most likely trying to delete a small precise area. Embodiments of the present invention recognize the aforementioned examples by changing the eraser size based upon the speed of a finger or curser across a touch-sensitive surface.

Implementation of embodiments of the invention may take a variety of forms, and exemplary implementation details are discussed subsequently with reference to the Figures.

Figure 1:
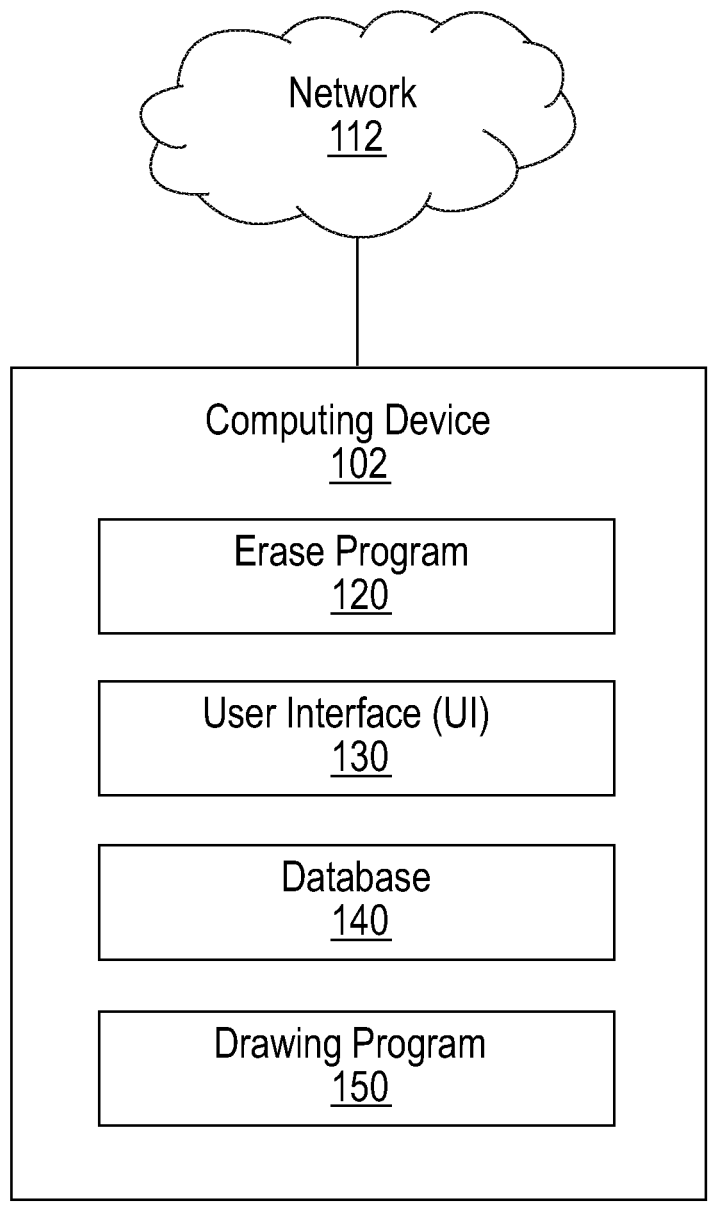
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 102 connected to network 112. Network 112 represents, for example, a telecommunications network, a local area network (LAN), a wide area network (WAN), such as the Internet, or a combination of the three, and includes wired, wireless, and/or fiber optic connections. Network 112 includes one or more wired and/or wireless networks that are capable of receiving and transmitting data, voice, and/or video signals, including multimedia signals that include voice, data, and video information.

In the depicted environment, computing device 102 represents a laptop computer, a tablet computer, a netbook computer, a personal computer (PC), a desktop computer, a personal digital assistant (PDA), a smart phone, or any programmable electronic device capable of communicating with network 112. In this embodiment, computing device 102 generates erasing paths and sizes based upon user input. In some embodiments, computing device 102 represents a server computing system utilizing multiple computers as a server system, such as in a cloud computing environment. In another embodiment, computing device 102 may be one or more of a management server, a web server, or any other electronic device or computing system capable of receiving, analyzing, and sending data. In another embodiment, computing device 102 represents a computing system utilizing clustered computers and components to act as a single pool of seamless resources. Computing device 102 may include components, as depicted and described in further detail with respect to FIG. 3, in accordance with embodiments of the present invention. Computing device 102 includes erase program 120, user interface (UI) 130, database 140, and drawing program 150.

In some embodiments, computing device 102 contains a touch-sensitive surface (e.g., a tablet) that allows for a user to touch the touch-sensitive surface to create inputs. In an example, a user may be able to trace a finger, stylus, etc. across the surface to create a representation on the screen of the computing device of the inputs traced on the touch-sensitive surface. In other embodiments, computing device 102 may be connected to a touch-sensitive surface via network 112 and operate to display the inputs traced on the touch-sensitive surface.

In depicted distributed data processing environment 100, erase program 120 resides on computing device 102 and generates erasing paths and sizes based upon user input. In various embodiments, erase program 120 identifies multiple positions touched by a user on a surface over a period of time. Erase program 120 then utilizes a smoothing function (e.g., a Bézier curve) to create a smooth path of erasing. In an example, erase program 120 may receive data points from the surface of a touch-sensitive device indicating a path a user is tracing on the surface of the device. Erase program 120 can then calculate an eraser size based upon the distance between points over a constant time interval. For larger distances between input points (e.g., faster speed of a user tracing of a path), erase program 120 may increase the size of the eraser. Conversely, for smaller distances between input points, erase program 120 may decrease the size of the eraser. In various embodiments, erase program 120 may be a subprogram of a drawing program, such as drawing program 150 or an independent program that communicates with a drawing program (e.g., drawing program 150). In some embodiments, erase program 120 may be an enhanced erase tool in a drawing program (e.g., drawing program 150). In yet another embodiment, erase program 120 may replace the erase tool in a drawing program (e.g., drawing program 150) with a custom erase tool generated by erase program 120. Erase program 120 is depicted and described in further detail with respect to FIG. 2.

In depicted distributed data processing environment 100, user interface (UI) 130 resides on computing device 102. UI 130 is a computer program that provides an interface between a user, erase program 120, and drawing program 150. A user interface refers to the information, such as graphic, text, and sound, a program presents to a user, and the control sequences the user employs to control the program. There are many types of user interfaces. In an embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In the depicted embodiment, database 140 resides on computing device 102. In another embodiment, database 140 may reside elsewhere in distributed data processing environment 100, such as within another computing device (not depicted) or independently as a standalone database that is capable of communicating with computing device 102 via network 112. A database is an organized collection of data. Database 140 is implemented with any type of storage device capable of storing data that is accessed and utilized by computing device 102, such as a database server, a hard disk drive, or a flash memory. In other embodiments, database 140 represents multiple storage devices within computing device 102. Database 140 stores information, configurations, and presets, such as initial or speed based eraser sizes, location of the area to erase based on the location of the input on the touch screen, the changes in size of the eraser based upon the speed of the inputs on the touch-sensitive surface, etc.

In the depicted embodiment, drawing program 150 is a program utilized to create drawings on a computing device. Drawing program 150 may be any program that a user can create a drawing and can also communicate with erase program 120. In various embodiments, drawing program 150 contains multiple drawing tools as well as an eraser tool that is capable of erasing previously created images or items in drawing program 150. In an embodiment, drawing program 150 may be a canvas, such as hypertext markup language (HTML) 5 canvas. In another embodiment, drawing program 150 may be scalable vector graphic (SVG). In yet other embodiments, drawing program 150 may be any drawing program capable of having an eraser tool known in the art.

Figure 2:
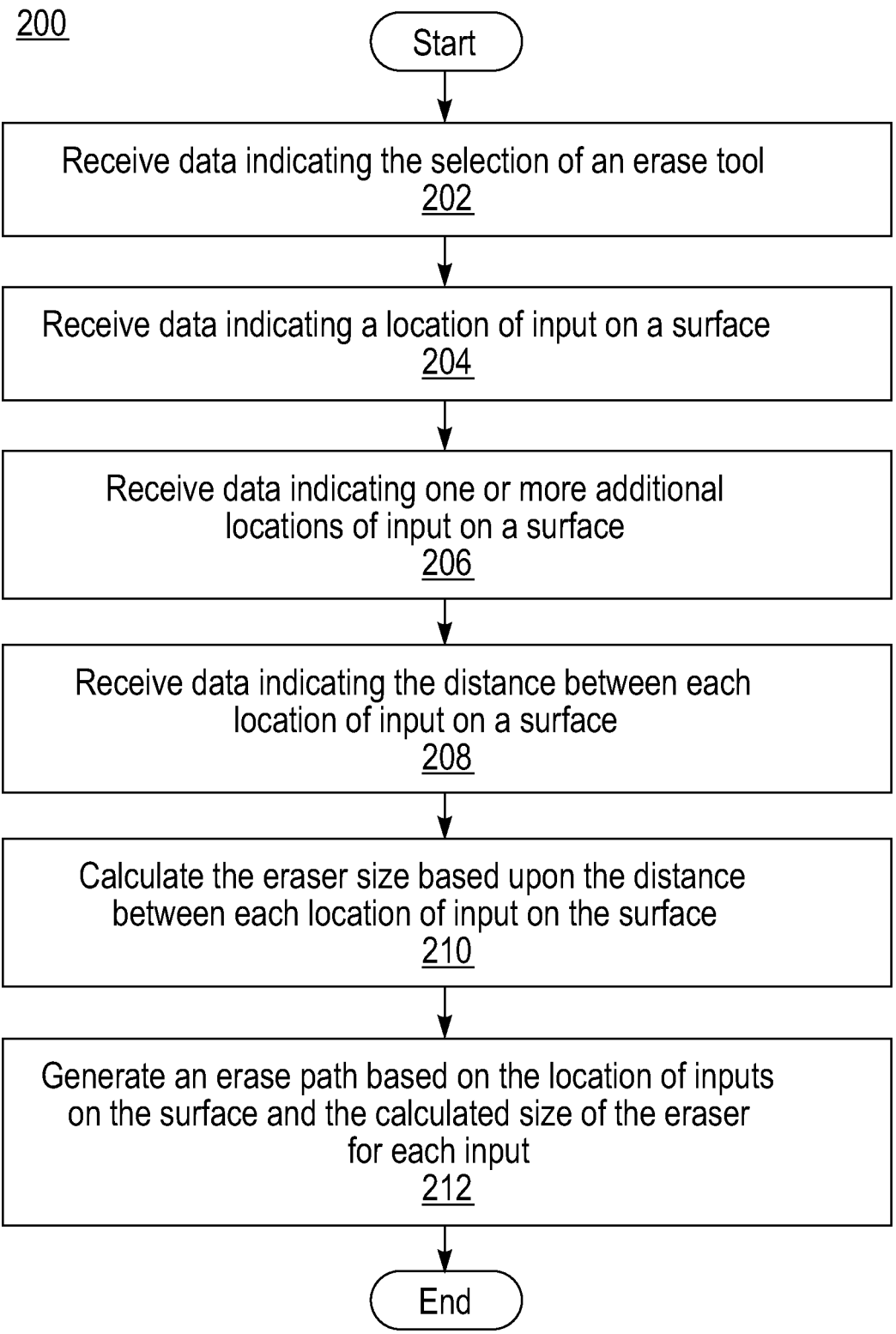
FIG. 2 is a flowchart depicting operational steps of a program for generating an eraser path and size within the distributed data processing environment of FIG. 1, in accordance with an embodiment of the present invention.

FIG. 2 is a flowchart depicting operational steps of program 200, which is a function of erase program 120, in accordance with an embodiment of the present invention. Program 200 operates on computing device 102 and adjusts the size of the eraser as well as smooths the path of the eraser. In various embodiments, program 200 may initiate in response to receiving a prompt when a user selects a drawing tool. In another embodiment, program 200 may monitor drawing program 150 for the selection of the erase tool. In yet another embodiment, the operational steps of program 200 may begin when a user selects an enhanced eraser tool.

Program 200 receives data indicating the selection of an erase tool (step 202). In some embodiments, program 200 receives data indicating a user has selected an erase tool in a drawing program (e.g., drawing program 150). In an example, a user selects an erase tool in drawing program 150 to begin erasing items within drawing program 150. In another example, a user is utilizing a touch-sensitive surface and creates drawings in drawing program 150 by creating inputs on the touch-sensitive surface. A user may select the erase tool by utilizing an input, such as a finger on the touch-sensitive surface, or by selecting the erase tool with another input, such as a keyboard or mouse. In other embodiments, program 200 receives data indicating a user has selected a delete tool in erase program 120.

Program 200 receives data indicating a location of input on a surface (step 204). In various embodiments, program 200 receives data indicating a location of input created by a user on the touch-sensitive surface. In an example, the touch-sensitive surface may have a grid of points. When a user touches the touch-sensitive surface, the location of the touch that corresponds to a location on the grid is sent to program 200. In another example, program 200 is constantly monitoring the touch-sensitive surface after the eraser tool is selected (step 202). Program 200 identifies a first location of input on the touch-sensitive surface via a grid that corresponds to locations on the touch-sensitive surface or any other method known by a person skilled in the art.

Program 200 receives data indicating one or more additional locations of input on a surface (step 206). In various embodiments, program 200 identifies a next or additional location of input on the touch-sensitive surface after a predetermined amount of time. In an example, program 200 identifies the location of a user input on the touch-sensitive surface at a preset time interval (e.g., $\frac{1}{100}^{th}$ of a second). As a user of computing device 102 traces a finger across the touch-sensitive surface, multiple inputs are recorded at the same time interval. In an example, one or more additional locations of input are received when a user holds a finger in one location on the touch-sensitive surface. In another example, if a user moves a finger across the touch sensitive surface at a fast pace, then the one or more additional locations may be spread out across the screen. In various embodiments, program 200 may have a preset maximum (e.g., 100 inputs) or minimum (e.g., 3 inputs) amount of inputs received before future calculations can be performed. In an example, program 200 may have a preset number of one or more additional locations of input as to reduce lag between what is showing on the screen of computing device 102 and the path the finger of the user traces on the touch-sensitive surface. In some embodiments, program 200 identifies that the user input is a continuous user input at one or more points in the interface. For example, a user moves a finger across a touch-sensitive surface without lifting the finger.

In various embodiments, program 200 records the locations of input in a database, such as database 140. In an example, program 200 identifies the location of the first input from a user (step 204). Then program 200 identifies the location of a second input after the preset time interval has elapsed. Program 200 may plot the point on a grid and store the location of each point in sequential order in database 140. In an example, a user traces a line across a touch-sensitive surface. Program 200 identifies the location of the user input every $\frac{1}{100}^{th}$ of a second until the user stops creating inputs (e.g., 1 second). Program 200 may store the location of each input of the 100 identified user inputs in database 140, logged according to the specific time each input was recorded.

Program 200 receives data indicating the distance between each location of input on the surface (step 208). In various embodiments, program 200 may receive the locations of multiple locations of input (received and identified in steps 204 and 206), and also receive information indicating the distance between each location in sequential order. In other embodiments, program 200 may calculate the distances between each point in sequential order. For example, the distance between the first point on the touch-sensitive surface is recorded as a point on a grid. Then, the second point is recorded after the preset interval of time as the point where the user's finger was touching the touch-sensitive surface when the preset time elapsed. The distance between the first and the second point are calculated based on the positions of each point on the grid and the preset time interval. In an example, a distance is then calculated for the distance between the second point and the third point on the touch-sensitive surface. In an example, the distance between one input point is calculated for the prior and subsequent input points, unless the input point is the first or the last input point. In some embodiments, program 200 stores the distances between each input point in database 140.

In alternate embodiments, program 200 may not measure distances over a preset time interval, but rather program 200 can calculate the speed or time between preset distance intervals. In an example, program 200 records the time between preset distances (e.g., 1 mm) as a user traces a finger across the touch-sensitive surface. Program 200 can determine the speed that a user moves a finger across a screen by calculating the distance traversed over the change in time.

Program 200 calculates the eraser size based upon the distance between each location of input on the surface (decision 210). In various embodiments, program 200 calculates the size of area to erase based upon the speed (e.g., distance over time) a user traced a finger, cursor, etc., across the touch-sensitive surface. In some embodiments, the eraser size may be calibrated by a user based upon the speed of a finger as the finger traces a path across the touch-sensitive surface. For example, the faster a finger moves across a surface, the larger the eraser becomes. The slower a finger traces across a surface, the smaller the eraser becomes. A user may be able to set maximum and minimum eraser sizes, as well as maximum and minimum eraser sizes based upon speed. In some embodiments, a user may also be able to calibrate all possible sizes of an eraser based upon the speed of inputs received or identified on the touch-sensitive surface.

In some embodiments, program 200 may have preset eraser sizes. For example, the smallest eraser size corresponds to the slow speeds, and conversely, the largest eraser size corresponds to the fast speeds. In an example, slow speeds corresponds to a small eraser size thereby enabling more detailed erasing, and conversely, fast speeds correspond broad erasing.

In multiple embodiments, program 200 calculates the eraser size for each input that was received or identified in steps 204 and 206. In an example, program 200 calculates the eraser size based upon the distance between each input (e.g., the further the distance between inputs, the larger the eraser size). The eraser size for each input may be stored in a database, such as database 140.

In various embodiments, the relation to the size of the eraser and distance between each location of input on the touch-sensitive surface may be created by different preset equations. For example, program 200 may utilize a linear equation to generate the change from small to large eraser size based upon the distance between input on the touch-sensitive surface. In another example, program 200 may utilize an exponential equation to generate the change from small to large eraser size based upon the distance between input on the touch-sensitive surface.

In some embodiments, a user may change the speed of movement as the user moves a finger across a touch-sensitive surface. Program 200 calculates a size of the eraser as the speeds change for every input. As a user tries to make detailed corrections, the speed decreases; and therefore, the size of the eraser decreases.

Program 200 generates an erase path based on the location of inputs on the surface and the calculated size of the eraser for each input (step 212). In various embodiments, program 200 generates an erase path and size of the eraser based upon the location of inputs, and the distance between each input. In some embodiments, program 200 may generate an erase path by utilizing a Bézier curve, thereby smoothing the path of the inputs as well as the size differences of the eraser along the path. In an example, program 200 identifies the locations of input to generate a path, as well as the calculated size of the eraser for each input, and utilizes a Bézier curve. The Bézier curve creates a smooth path (e.g., creates a curved path rather than straight lines between points), which results in a more seamless transition from one eraser size to the next as well as a curved path of the eraser across the input locations. In another embodiment, program 200 utilizes a non-uniform rational base spline. In an example, program 200 utilizes a non-uniform rational base spline for the inputs previously recorded or identified to create a curved path for the eraser instead of a straight line path between each received or identified input location. In yet other embodiments, program 200 utilizes other methods known by one skilled in the art to create a curved path based upon multiple points of input.

Figure 3:
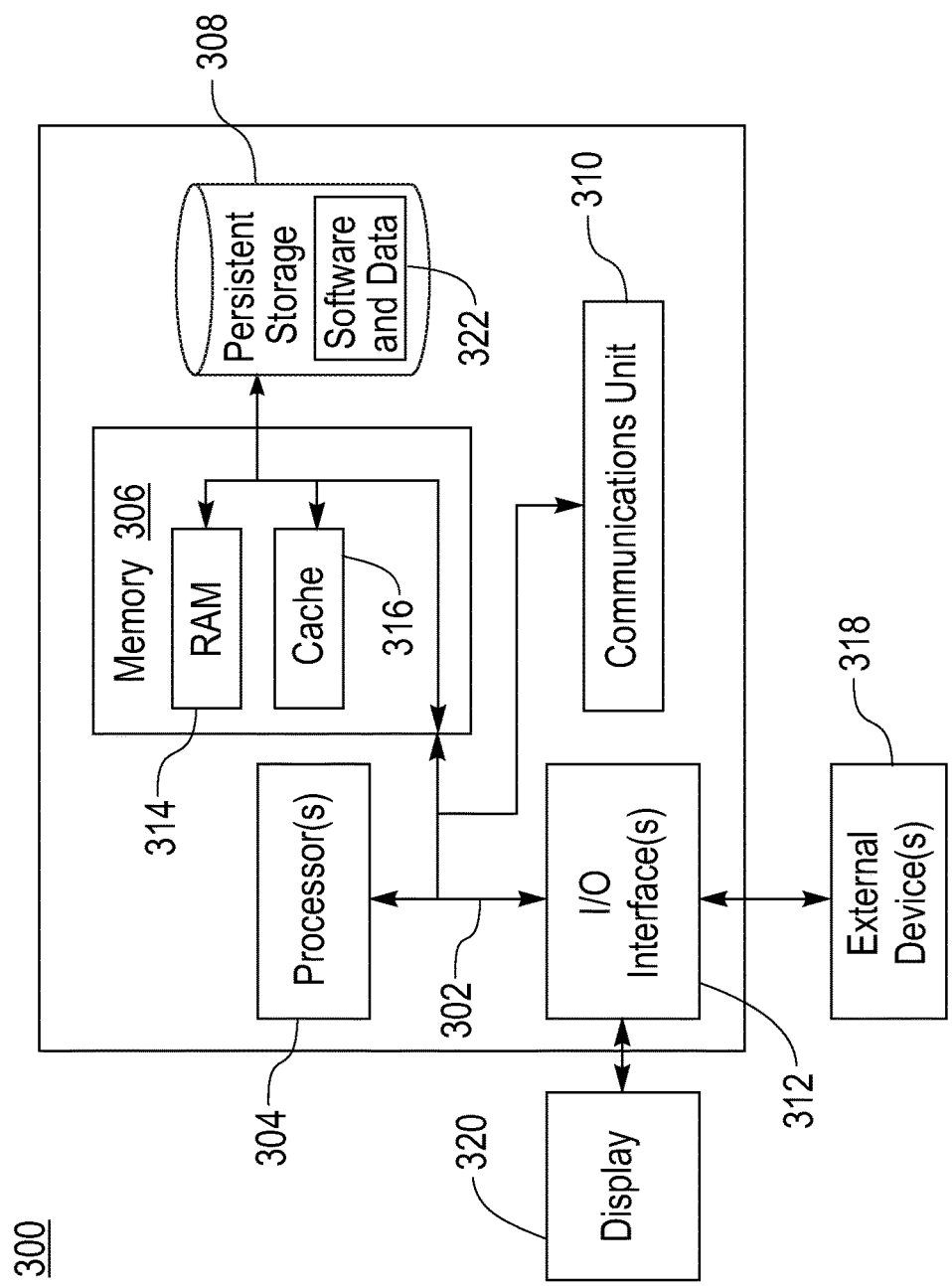
FIG. 3 depicts a block diagram of components of computing devices of FIG. 1, in accordance with an embodiment of the present invention.

FIG. 3 depicts a block diagram of components of computer 300, which is representative of computing device 102, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache 316. In general, memory 306 can include any suitable volatile or non-volatile computer readable storage media. Software and data 322 are stored in persistent storage 308 for access and/or execution by processor(s) 304 via one or more memories of memory 306. With respect to computing device 102, software and data 322 represents erase program 120 and database 140.

In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface(s) 312 may provide a connection to external device(s) 318, such as a keyboard, a keypad, a touch screen, and/or some other suitable input device. External device(s) 318 can also include portable computer readable storage media, such as, for example, thumb drives, portable optical or magnetic disks, and memory cards.

Software and data 322 can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system for generating an eraser path, the computer system comprising:
   one or more computer processors;
   one or more computer readable storage media;
   program instructions stored on the computer readable storage media for execution by at least one of the one or more computer processors, the program instructions comprising:
   program instructions to identify a first location, a second location, and a third location of input touch-sensitive surface;
   program instructions to calculate a distance between the first location, the second location, and the third location;
   program instructions to identify a first elapsed time between creation of the identified first location of input and the identified second location of input;
   program instructions to identify a second elapsed time between creation of the identified second location of input and the identified third location of input;
   program instructions to calculate a first size of an eraser based upon the identified first elapsed time, wherein generating a first size of an eraser comprises:
      program instructions to utilize a Bezier curve to smooth a change in size between the calculated first size of an eraser and the calculated second size of the eraser, and wherein calculating a first size of an eraser based upon the identified first elapsed time comprises:
      program instructions to calculate a speed for the input on the touch sensitive surface to traverse from the first location of input to the second location of input as a function of distance over time;
      program instructions to generate an eraser size for the second location of input based upon the calculated speed;
   program instructions to calculate a second size of an eraser based upon the identified second elapsed time, wherein generating a second size of an eraser comprises utilizing a Bezier curve to smooth a change in size between the calculated first size of an eraser and the calculated second size of the eraser;
   program instructions to generate an updated eraser path based upon the identified first location, the identified second location, and the identified third location of input on a touch-sensitive surface, and the calculated first size of an eraser and the calculated second size of an eraser, wherein generating an eraser path comprises utilizing a Bezier curve to create a curved path between the identified first location, the identified second location, and the third identified location;

program instructions to identify a preset initial eraser size for the first identified location of input;

program instructions to generate an eraser path based upon the identified first location and the identified second location of input on a touch-sensitive surface, and the identified preset initial eraser size for the first identified location, the calculated first size of an eraser;

program instructions to identify a plurality of locations of input on a touch-sensitive surface;

program instructions to identify a distance between each identified location of input and a subsequent location of input from the plurality of location of input;

program instructions to identify a time elapsed between each locations of input and the subsequent location of input from the plurality of locations of input;

program instructions to calculate a size of an eraser for each location of input based upon the identified time elapsed between each location of input and the subsequent location of the input from the plurality of locations of input; and program instructions to generate an eraser path based upon the plurality of locations of input and the calculated size of an eraser for each location of input.

* * * * *